Feb. 25, 1947.  W. H. RENNIE  2,416,594
FISH SCRUBBING MACHINE
Filed April 18, 1944  2 Sheets-Sheet 1
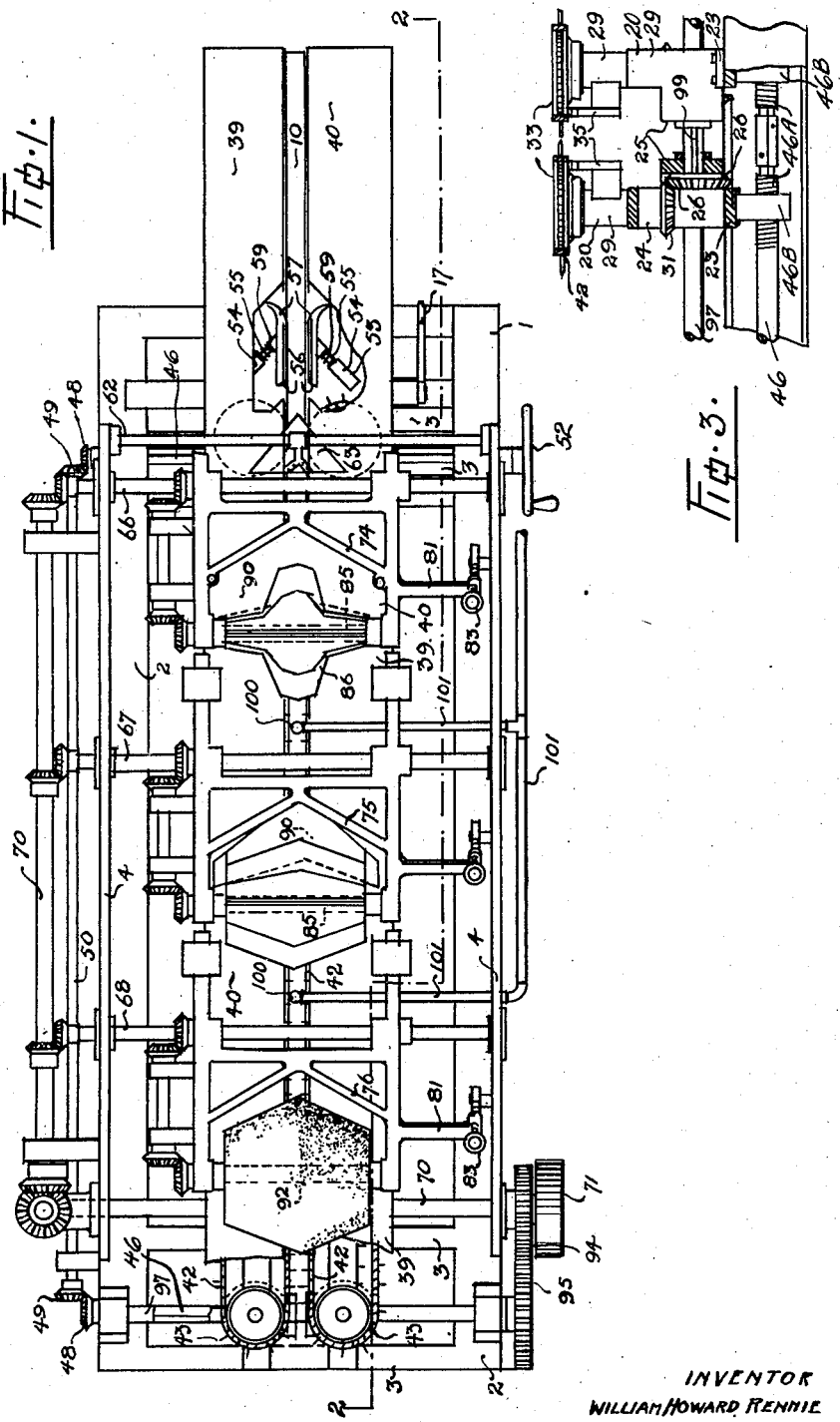
INVENTOR
WILLIAM HOWARD RENNIE
Ernest E Carver
ATTORNEY.

Feb. 25, 1947. W. H. RENNIE 2,416,594
FISH SCRUBBING MACHINE
Filed April 18, 1944 2 Sheets-Sheet 2
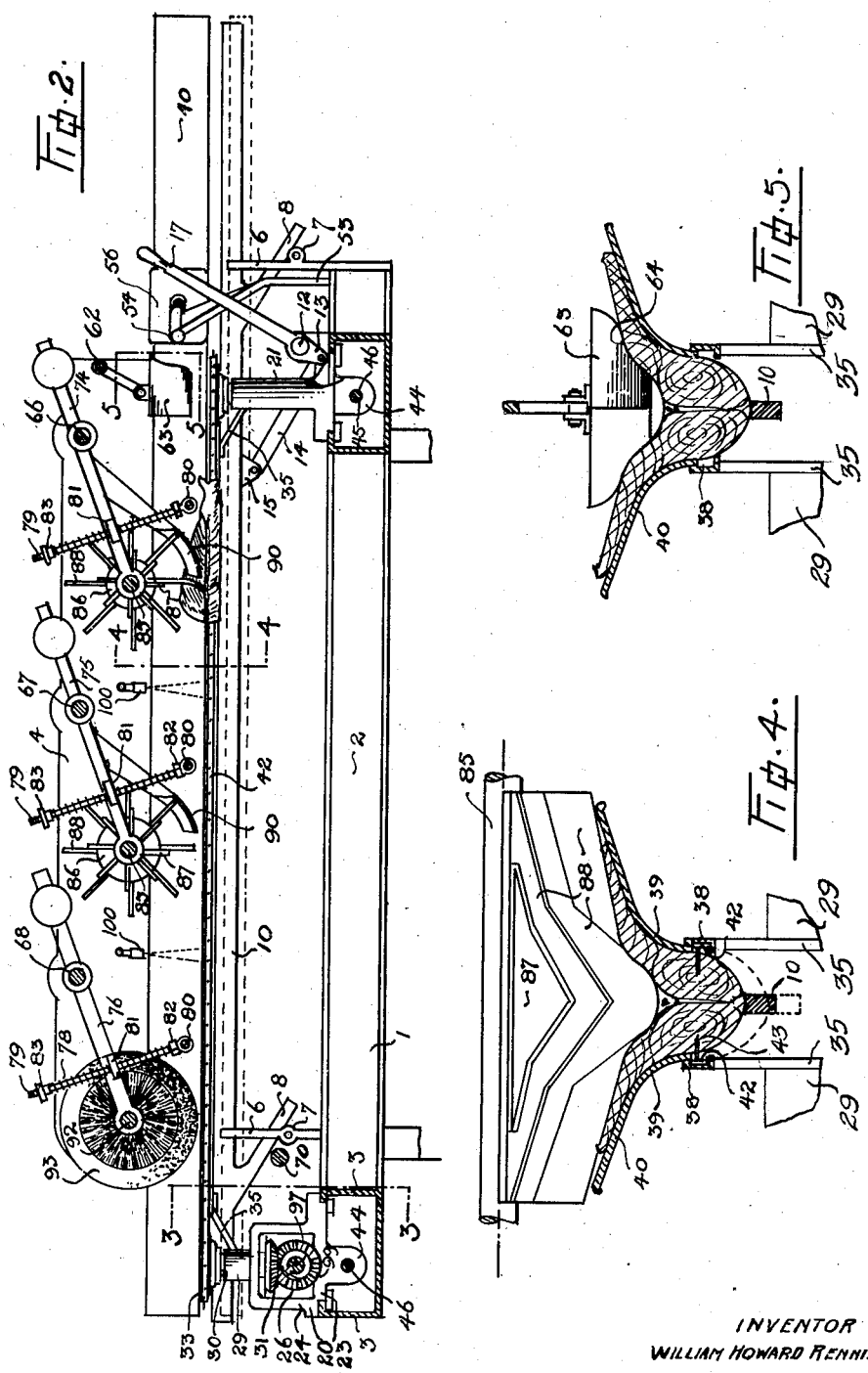
INVENTOR
WILLIAM HOWARD RENNIE
Ernest E Carver
ATTORNEY Patented Feb. 25, 1947

2,416,594

UNITED STATES PATENT OFFICE 2,416,594

FISH SCRUBBING MACHINE

William Howard Rennie, Vancouver, British Columbia, Canada

Application April 18, 1944, Serial No. 531,547

7 Claims. (Cl. 17—3)

My invention relates to improvements in fish scrubbing machines which are particularly adapted for cleaning salmon and the like prior to canning.

In prior devices the bed, upon which the fish travelled while subjected to the action of cleaning devices, remained at a constant position, so that the cleaning devices exerted a greater effort on a thick or large fish when on the bed than they did on a thin fish. It is an object of the invention to provide means whereby all fish irrespective of size may be subjected to equal scrubbing effort. Further objects are to provide means to clean out the blood embedded in the fish's vertebrae and to provide means whereby every part of the inner surface of a gutted fish, from gill bone to ventricle, shall be adequately cleansed without dislodging or disturbing the ribs from the flesh of the fish's sides. These and other objects will become apparent as the specification proceeds.

Referring to the drawings—

Fig. 1 is a plan view of the invention.

Fig. 2 is a sectional view taken on the line 2—2 of Figure 1 showing one side bed plate removed.

Fig. 3 is a detail sectional view taken on the line 3—3 of Figure 2.

Fig. 4 is a detail sectional view taken on the line 4—4 of Figure 2.

Fig. 5 is a detail sectional view taken on the line 5—5 of Figure 2.

In the drawings like characters of reference indicate corresponding parts in each figure.

The numeral 1 indicates generally a frame having longitudinal members 2 and pairs of transverse members 3. Side plates 4 are mounted upon the members 2 which support bearings and other parts to be hereinafter described and also serve to enclose the machine.

In the longitudinal centre of the frame 1 pairs of light spaced standards 6 are erected, each pair of which supports a transverse roller 7 upon which is carried a downwardly inclined cam 8 of a back rest 10. The back rest 10 extends the length of the frame and forms a support for the fish passing through the machine. A shaft 12 extends transversely of the frame and is provided with a short crank 13 which connects through a link 14 to a pair of spaced lugs 15 secured to the underside of the back rest 10. The shaft 12 is fitted at one end with a lever 17 by which it is rocked to impart endwise movement to the back rest and also vertical movement thereto by virtue of the cams 8 moving upon their rollers 7.

Slidably mounted upon the pairs of transverse members 3 are pairs of bearing blocks 20 and 21. The blocks 20 are those at the rear or left hand end of the machine and are shown in detail in Figure 3, whereas the blocks 21 are adjacent the feed entrance or the right hand end of the machine. Each of the blocks 20 has a pair of guides 23 surmounted by a frame 24 which frame is provided with an end wall 25, see Figure 3, and journals a bevelled gear 26 which is slidably mounted upon a drive shaft to be hereinafter referred to. The frame 24 supports a vertical bearing 29 in which a shaft 30 is fitted. At the lower end of the shaft 30 a mitre bevelled gear 31 is secured which meshes with the bevelled gear 26 from which it is driven and at the top of the shaft a chain sprocket 33 is fitted. From each bearing 29 and from each block 21 is a bracket 35 extending longitudinally of the machine. These brackets support channels 38 and a bed plate 39 which extends from end to end of the machine. The two bed plates 39 form a bed 40 and are curved transversely to conform conveniently to the shape of a dressed fish when lying with its dorsal fin and back on the back rest 10 and its skirt portions laid out as shown in Figure 4 to expose the inner walls and ribs of the fish. Surrounding the sprockets 33 and extending along the channels 38 are conveyor chains 42 equipped with spikes 43 which impale the sides of the fish to carry it along the bed 40 and under the several cleaning devices.

The bearing blocks 20 and 21 are each fitted with a lug 44 which projects downwardly between the transverse members of the frame. Each of the lugs is provided with a threaded aperture 45 through which a threaded shaft 46 passes. The threads engaging adjacent lugs are opposite handed, so that when the shaft 46 is turned in one direction the bearing blocks of a pair slide along the members 3 away from each other to widen the spacing between the inner runs of the chains 42, the channels 38 and the bed plates 39, and to reverse all these movements when the shafts 46 are rotated in the reverse direction.

The shafts 46 are suitably journalled in bearings in the longitudinal members 2 and are fitted with mitre gears 48, see Figure 1. The gears 48 mesh with other mitre gears 49 secured to opposite ends of a shaft 50 which is suitably journalled along the rear side of the machine. One of the shafts 46 is fitted with a hand wheel 52 which is conveniently placed to the person feeding fish to the machine, so that he may vary the spacing of the bed plates 39 at will to conform to increase or decrease in the size of the fish to be fed into the machine for treatment. The shafts 46 are each provided intermediate their length with a right and left hand thread 46A which engage lugs 46B projecting downwardly from the blocks 20 and 21, so that rotation of the shafts 46 will cause the blocks of each pair to move relatively to each other along their shafts. These threads and lugs are shown only in Figure 3.

Adjacent the feed end of the machine a pair of standards 53 are mounted, each of which terminates at its upper end in a sleeve 54, and each sleeve is fitted with a shaft 55 which supports an arcuate plate 56 having a flared end 57. The plates 56 are urged towards each other by springs 59 and project upwards through the bed 40 into line therewith, so that when a fish is thrust with its sides or skirts held together it will be properly aligned so that the back of the inverted fish will rest upon the back rest 10 and the upper sides of the fish will pass between the chains 42. Suspended from a transverse bar 62 is a spreader generally indicated by the numeral 63, which is V-shaped in plan with its point directed toward the fed end of the machine. The spreader is shaped to conform in cross section to the interior surface of the average fish when laid out upon the bed 40 as at 64, so that as a fish reaches the spreader its sides are opened out and laid out evenly upon the bed plates as shown in Figure 5.

Extending between the side plates 4 are three transverse driven shafts 66, 67 and 68, which are collectively driven through a gear and shaft drive train 70 from a drive pulley 71 adjacent the delivery end of the machine. The shafts 66, 67 and 68 are fitted with balanced rocking brackets 74, 75 and 76, each of which brackets is resiliently held in adjusted position by a pair of springs 78 fitted upon a rod 79, the rod being pivotally secured to a side frame through a pin 80 and extending through an extenstion 81 of the rocking bracket, the springs bearing at their outer ends against a nut 82 at the base of the rod and a threaded hand wheel 83 at the upper end of the rod and their inner ends abutting opposite sides of the extension 81. Journalled between the sides of each of the rocking brackets 74 and 75 and at their lower ends are shafts 85 which are suitably driven from the drive train 70 and on each of these shafts a rotary scraper 86 is mounted which consists of a rigid spider 87 to each of the legs of which a relatively heavy resilient scraper element 88 is secured. The scraper elements 88 extend parallel to their shafts and are shaped to substantially conform to the cross section of the centre portion of the inner cavity of the fish supported on the bed, so as to sweep the centre portion of the fish and disturb the blood clot membrane overlying the vertebrae of the fish. The scraping elements of the second scraper are as shown in Fig. 4, the central portion of said scraper elements being at a relatively acute angle to each other, and the outer or side portions being at an obtuse angle to each other. Mounted to swing with the rocking brackets 74 and 75 are shields 90 which are curved to conform to the inner transverse contours of the fish when on the bed 40 and extend to points just to the rear of the line of contact of the scraper elements 88 with the fish. These shields serve to hold the fish down firmly onto the bed plate, so that the scraper elements cannot strike too heavily upon it and damage the skin or disturb any of the ribs or flesh surface.

The shields also wipe out creases in the skirt portions so that said portions are always presented to the scraping elements as definite planes. They serve also by bearing on the fish to limit the downward swing of the scrapers to the work to be done.

Mounted between the lower side extremities of the rocking bracket 76 is a shaft 92 to which is secured a brush 93 which is adapted to give a final brushing to the fish after it has been acted upon by the previously described cleaning devices. The shaft 92 is also driven by suitable means from the drive train 70.

A pinion wheel 94 coupled alongside the pulley 71 drives, through a gear wheel 95, a transverse shaft 97 on which is slidably fitted the two bevelled gears 26. The gears 26 are journalled in the end walls 25 of the bearing blocks 20 wherein they are suitably held against endwise movement. The shaft 97 is provided with a key 99 which engages both bevelled gears so that they and the chain sprockets 33 may be continuously driven and the bearing blocks 20 may be moved towards or away from each other.

At intervals of the length of the bed 40 and directed downwardly at its centre are one or more nozzles 100 which are supplied by water under suitable pressure from a pipe 101. These nozzles are adapted to project a stream of water at high velocity onto the blood clot to break down its wall and wash out the blood from the vertebrae of the fish.

In use, fish from which the entrails and heads have been previously removed, are placed successively upon the bed 40 on their backs with the gill bone leading. Each fish is held with its sides in close contact and is pushed partly through the arcuate plates 56 until said fish is caught by the spikes 43 of the conveyor chains and drawn against the spreader 63 which lays the sides or skirts of the fish down onto the bed. As the fish moves along, the first shield 90 bears down upon the fish and holds it in suitably firm contact with the bed, so that the first acting scraper 86 vigorously scrapes the centre or solid portion of the fish's interior, disturbing the membrane of the blood clot and generally removing it. Immediately following this scraping, water is forced onto the spinal vertebrae which washes out the blood of the clot after breaking down the membrane, if the latter has not already been done by the scraper. The second scraper then engages the fish's interior, cleaning both the centre portion and the side portions or skirts, the scraping action being in the direction of from head to tail of the fish. The scraping action is sufficient to remove all unwanted material from the surfaces acted upon and the shields 90 extending almost to the point of contact of the scraper elements 88 hold the fish down without creases in its surface and to such an extent that the interior surface immediately adjacent the gill bone, which normally tends to fold over, is held down firmly and is thoroughly scraped. Following the second scraping, the interior is again washed by water from the second nozzle 100 and is then scrubbed with the brush, leaving it clean and ready for canning.

What I claim as my invention is:

1. A fish cleaning machine comprising a bed consisting of bed plates spaced apart to engage the sides of a gutted fish between its vertebrae and its dorsal fin, means below the bed for conveying the fish lengthwise of said bed, means disposed above said bed for acting upon the inner surfaces of the fish to clean it and means for varying the spacing between the bed plates to engage fish of different thicknesses.

2. A fish cleaning machine comprising a bed consisting of bed plates spaced apart to engage the sides of a gutted fish between its vertebrae and its dorsal fin, means below the bed for conveying the fish lengthwise of said bed, means disposed above said bed for acting upon the inner surfaces of the fish to clean it and means for varying the spacing between the bed plates to engage fish of different thicknesses during the running of the machine.

3. A fish cleaning machine comprising a bed consisting of bed plates spaced apart to engage the sides of a gutted fish between its vertebrae and its dorsal fin, means below the bed for conveying the fish lengthwise of said bed, means extending along the interspace between the bed plates for supporting the fish against vertical movement between the plates, means above said bed for acting upon the inner surfaces of the fish to clean it, and means for moving the fish supporting means vertically, said means facilitating the disposition of the fish's vertebrae at a given position relative to the bed plates.

4. A fish cleaning machine comprising a bed consisting of bed plates spaced apart to engage the sides of a gutted fish between its vertebrae and its dorsal fin, means below the bed for conveying the fish lengthwise of said bed, means extending along the interspace between the bed plates for supporting the fish against vertical movement between the plates, means above said bed for acting upon the inner surfaces of the fish to clean it, means for varying the spacing between the bed plates to engage fish of different thicknesses, and means facilitating the disposition of the fish's vertebrae at a given position relative to the bed plates.

5. In a fish cleaning machine having a conveyor for holding the fish and for carrying it past cleaning devices, a bed for supporting the fish during the cleaning process, said bed comprising two bed plates spaced apart, each of said plates being transversely curved to define a lower portion and an upper portion, the lower portion of the pair of bed plates being so disposed as to engage portions of the sides of the fish between the vertebrae and the dorsal fin, and the upper portion of each bed plate being adapted to receive a body or skirt of the fish, and means for moving the bed plates laterally with respect to each other.

6. A fish cleaning machine having a frame, a conveyor upon the frame for moving a fish past cleaning devices, a bed consisting of two bed plates for supporting the fish as it is moved by the conveyor, said conveyor consisting of a pair of endless chains having fish engaging devices, a pair of bearing blocks mounted for sliding movement, transversely of each end of the frame, said blocks serving to support one run of each of the endless chains between said blocks and one of said bed plates, and means for moving the bearing blocks to vary the spacing of the bed plates.

7. In a fish cleaning machine having a bed, an endless conveyor for moving the fish along the bed, a scraping device comprising a rotary spider having transverse members, a flexible scraper element secured to each transverse member and having its free edge constructed to conform substantially to the configuration of a part of the inner surface of a fish, and means for resiliently mounting said scraping device to enable the latter to follow the line of the vertebrae of the fish on the conveyor.

WILLIAM HOWARD RENNIE.

REFERENCES CITED

The following references are of record in the file of this patent:

UNITED STATES PATENTS

| Number | Name | Date |
|---|---|---|
| 592,500 | Stevenson | Oct. 26, 1897 |
| 1,107,100 | Palmer | Aug. 11, 1914 |
| 1,217,809 | Nicholson | Feb. 27, 1917 |
| 735,994 | Morris | Aug. 11, 1903 |
| 1,267,850 | Cooper | May 28, 1918 |